P. ARBOGAST.
Manufacture of Glass Encased Wire.
No. 222,768. Patented Dec. 23, 1879.
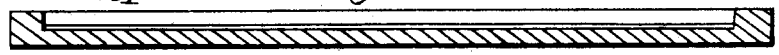
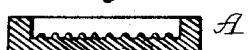
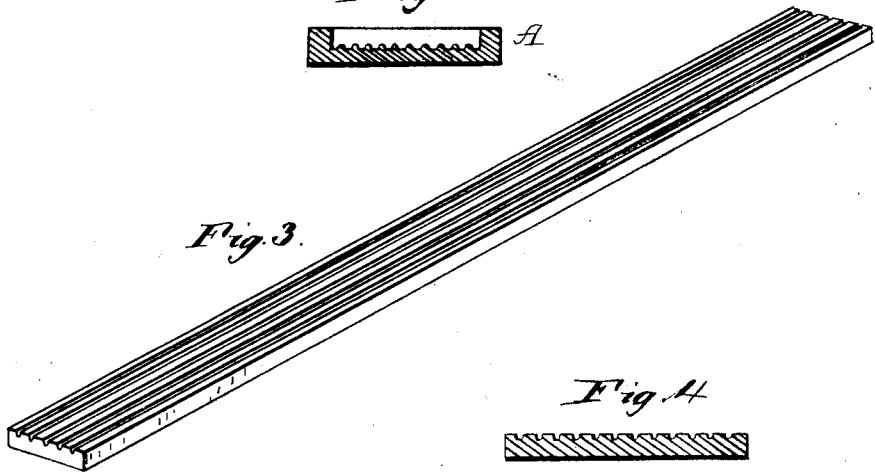
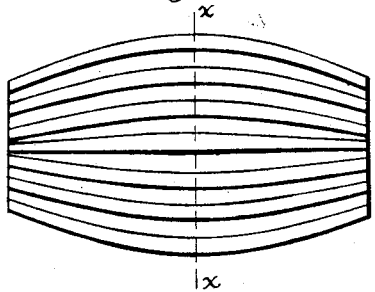
WITNESSES
Philip Arbogast. INVENTOR
Connolly Bros & McTighe
ATTORNEYS

UNITED STATES PATENT OFFICE.

PHILIP ARBOGAST, OF PITTSBURG, PENNSYLVANIA.

IMPROVEMENT IN THE MANUFACTURE OF GLASS-INCASED WIRES.

Specification forming part of Letters Patent No. 222,768, dated December 23, 1879; application filed November 6, 1879.

*To all whom it may concern:*

Be it known that I, PHILIP ARBOGAST, of Pittsburg, in the county of Allegheny and State of Pennsylvania, have invented certain new and useful Improvements in the Manufacture of Glass-Incased Wires; and I do hereby declare the following to be a full, clear, and exact description of the invention, such as will enable others skilled in the art to which it pertains to make and use it, reference being had to the accompanying drawings, which form part of this specification, in which—

Figures 1 and 2 show the mold in section, longitudinal and transverse, respectively. Figs. 3, 4, 5, 6, and 7 show the glass as molded or otherwise produced.

This invention relates to processes of incasing wires in glass or other vitreous substance, and comprises the preparation of the glass strips or slabs, and the subsequent steps for producing the finished article.

The invention consists, broadly, in forming longitudinally-grooved strips or slabs of glass or other vitreous substance by molding, drawing, rolling, or otherwise, then piling two or more such prepared strips with the wires laid in the grooves, and, finally, consolidating the whole by the application of heat.

In a former application I have shown a process of incasing wires in glass by laying them between two strips, both of which could be cold or both molten, or one cold and the other molten.

In all cases the wires were not guided in any manner between the ends, and though the product resulting from that method exhibited a homogeneous structure, the wires were apt to run irregularly, getting too near the edge in some places.

To preserve the wires at a regular and uniform distance apart, and to facilitate the operations as much as possible, are the objects of my present invention, which is as follows:

By means of a mold, A, having a grooved bottom, I form the grooved strip or slab of glass. (Shown in perspective by Fig. 3, and in section by Fig. 4.) After forming a sufficient number of such strips, I lay them, grooved side up, end to end, in a suitable oven; then lay the wires in the grooves, and cover with similar strips or strips of plain glass, and, finally, consolidate the whole by heating to a suitable temperature.

The wires, being retained by the grooves, do not vary from their original location, and the ribs between the grooves effect a more rapid consolidation than takes place between plain strips of glass with the wires simply laid between.

The described grooved strips may be produced in an open-top mold, or in one with a plunger, or in a two-part mold, or by rolling. It may also be produced by molding a block, as in Figs. 6 and 7, with elliptical grooves much larger than required, and, while the block is still in a plastic condition, drawing it out after the manner of making glass tubes, until it has assumed the required size.

Several layers of wire may be incased by piling several strips and laying the wires as shown in section by Fig. 5. The strips may be formed with the grooves on both faces, if desired.

Instead of laying the strips on the oven-hearth, they may be first arranged in a matrix of refractory material, or such substance as will be removable after cooling; or, as in my former application, they may be laid in an iron casing.

In making the article of the short strips which are united by heat, the ends may be molded with rabbeted, dovetailed, or overlapping ends, if so desired.

I do not herein lay any claim, broadly, to the incasing of wires in glass or other vitreous material, as patented to me October 28, 1879, as the object of my present improvements is to facilitate the practice of that invention, as hereinbefore fully set forth; but

I claim as my invention—

1. The herein-described improvement in the manufacture of glass-incased wires, by forming grooved strips of glass by suitable means, then laying the wires in said grooves, capping the grooved strips with similar or plain strips, and, finally, consolidating the whole by heat.

2. In the manufacture of glass-incased wires, the method of preparing the glass for the reception of the wires, by forming it in grooved strips.

3. The described compound pile consisting of a strip or strips of grooved glass, wires laid in said grooves, and a cap-strip of plain or grooved glass, substantially as specified.

In testimony that I claim the foregoing I have hereunto set my hand.

PHILIP ARBOGAST.

Witnesses:
A. V. D. WATTERSON,
T. J. KEENAN, Jr.